(12) United States Patent
Martinez Antón

(10) Patent No.: US 8,579,446 B2
(45) Date of Patent: Nov. 12, 2013

(54) VARIABLE-SPECTRUM SOLAR SIMULATOR

(75) Inventor: Juan Carlos Martinez Antón, Madrid (ES)

(73) Assignee: Abengoa Solar Technologies, S.A., Sevilla (ES)

( * ) Notice: Subject to any disclaimer, the term of this patent is extended or adjusted under 35 U.S.C. 154(b) by 24 days.

(21) Appl. No.: 13/257,465

(22) PCT Filed: Mar. 26, 2010

(86) PCT No.: PCT/ES2010/000126
§ 371 (c)(1),
(2), (4) Date: Oct. 25, 2011

(87) PCT Pub. No.: WO2010/109037
PCT Pub. Date: Sep. 30, 2010

(65) Prior Publication Data
US 2012/0057324 A1 Mar. 8, 2012

(30) Foreign Application Priority Data
Mar. 27, 2009 (ES) .................................. 200900845

(51) Int. Cl.
*F21V 9/02* (2006.01)
(52) U.S. Cl.
USPC .................. 362/2; 362/1; 362/232; 362/293; 362/557
(58) Field of Classification Search
USPC .......... 362/1, 2, 231, 232, 293, 557; 356/310, 356/326, 328; 385/125, 900
See application file for complete search history.

(56) References Cited

U.S. PATENT DOCUMENTS

| | | |
|---|---|---|
| 3,202,811 A | 8/1965 | Hall, Jr. |
| 3,744,879 A | 7/1973 | Beard et al. |
| 4,641,227 A | 2/1987 | Kusuhara |
| 4,789,989 A | 12/1988 | Stern et al. |
| 5,217,285 A | 6/1993 | Sopori |
| 6,590,149 B2 | 7/2003 | Adelhelm |
| 2005/0270524 A1 | 12/2005 | Wang et al. |
| 2007/0146700 A1 | 6/2007 | Kowarz et al. |

FOREIGN PATENT DOCUMENTS

| | | |
|---|---|---|
| EP | 1 126 294 | 8/2001 |
| WO | WO 02/44800 | 6/2002 |

*Primary Examiner* — Stephen F Husar
*Assistant Examiner* — Meghan Dunwiddie
(74) *Attorney, Agent, or Firm* — Hamre, Schumann, Mueller & Larson, P.C.

(57) ABSTRACT

The invention relates to a variable-spectrum solar simulator for characterising photovoltaic systems. The simulator can be used to obtain a spectrum adjusted to the solar spectrum, both for a standard spectrum or a real spectrum adjusted to local irradiation conditions. The simulator also allows the spatial-angular characteristics of the sun to be reproduced. The invention comprises: a broad-spectrum light source, the flux from which is emitted through an aperture; an optical system which collimates the primary source; a system which disperses the beam chromatically; an optical system which forms an image of the dispersed primary source at a given position, at which a spatial mask is placed in order to filter the received irradiance spectrally; an optical system which captures the filtered spectrum and returns, mixes and concentrates same in a secondary source with the desired spectral, angular, and spatial characteristics; an optical system which collimates the secondary source such that it reproduces the angular characteristics of the sun; and a control system.

13 Claims, 4 Drawing Sheets

VARIABLE-SPECTRUM SOLAR SIMULATOR

FIELD OF THE ART

The invention falls within the field of solar simulators, more specifically the system serves to generate a laboratory source with the characteristics of the sun, reproducing its spectrum and its angular or collimating properties. Both the spectrum and the collimation can be modulated at will.

STATE OF THE ART

The growing need for renewable and sustainable energies has given new impetus to the photovoltaic conversion of solar energy. Photovoltaic technology is based on the photoelectric effect. When certain materials called semiconductors are exposed to sunlight, electrons from the valence band can be excited into the conduction band. When this phenomenon occurs, the physical structure of the semiconductor creates an electric field that establishes a path of electrons in a way that generates an electrical current. This photoelectric effect takes place in photovoltaic cells.

The characterisation of the response of photovoltaic cells is done through systems that essentially reproduce a spectrum similar to the solar. AM1.5G spectrum is the benchmark that is used for the characterisation of photovoltaic systems and cells of flat module technology (according to IEC 61904-1). To carry out characterisation of said systems in the interior, a laboratory light source that can reproduce that spectrum is necessary. These are called solar simulators, which essentially reproduce a spectrum similar to solar.

In this sense, conventional simulators make use of a primary source (xenon and halogen lamps) that reproduces a spectrum quite similar to AM1.5G. These lamps have a number of peaks in the near infrared (800 to 1,000 nm) that are usually eliminated by using dichroic filters. The optics is configured to obtain a uniform irradiance as close as possible to the solar irradiance. This configuration is useful in flat module conventional photovoltaic technologies and even those working at low concentration as silicon cells and homojunction photovoltaic cells.

In the case of high concentration systems, wherein an optical system to concentrate sunlight over 200 times on a high efficiency cell is used, the situation is different. Today there is no reference standard for characterising these types of systems. However, the use of xenon lamps with spectral filters does not provide data as reliable as in the case of flat module since the photovoltaic cells used, typically multi-junction organized in tandem, such as for example those based on III-V semiconductors; need a coupling in series of electric current flowing through the cell. Each p-n junction generates a certain amount of photo-electrons in its absorption band and that should be the same amount in the other p-n junctions coupled in series for optimum performance. This design provides the photovoltaic cells with great sensitivity to the spectral distribution of solar source, which requires careful design that should consider the radiation spectrum that the cell will nominally receive.

Therefore, is not possible to carry out the characterisation of its response with known solar simulators as the similarity to the solar spectrum is poor, is fixed in advance and is limited by design, since the dichroic filters do not allow adjusting the spectrum on a fine way without increasing the cost of the simulator in a prohibitive manner. It is therefore necessary a lower-cost system that can generate variable spectra and much closer to the spectral distribution of solar energy.

On the other hand, the fact of using high concentration optics causes the need to strictly align the system towards the sun. The current solar simulators are not designed to meet the need of a simulated source that has the same angular distribution characteristics of the sun and thus able to faithfully reproduce the real operating conditions of the photovoltaic device.

The current state of the art shows a multitude of variations of solar simulators. With regard to characterisation of conventional solar cells, as previously stated, IEC 61904-1 specifies the minimum conditions to be met by the illumination source. These requirements are usually fulfilled by using a xenon lamp followed by an AM1.5 filter. However, improvements have continually appeared aimed at specific applications.

Focusing the analysis on simulators the improvement proposals of which match those of the invention, primarily the ability to reproduce very accurately the solar spectral distribution, several approaches can be found in the state of the art.

For example, the system proposed in U.S. Pat. No. 4,641,227 is quite simple and therefore little versatile. The use of a xenon lamp in combination with an incandescent filament lamp is considered. The sum of both reproduces with certain accuracy the AM1.5 spectrum; however, the possibility of reproducing different spectral distributions is not available. Furthermore, for characterising the concentration systems the degree of approach to the solar spectrum is still insufficient.

Meanwhile in U.S. Pat. No. 4,789,989 and U.S. 5217285 A, systems that use a series of lamps and waveguides for obtaining different sources of radiation in certain spectral ranges are proposed. By controlling the type and number of lamps and the radiation intensity of each one of them, the output spectrum can be controlled.

Finally, in U.S. Pat. No. 6,590,149B2 the light source consists of a single lamp. One or more different filters are used provided with a drive system that allows moving it letting through the amount of light needed for each one of them to reproduce in the receiver the desired spectrum.

With regard to solar simulators designed specifically for concentrating systems, most proposals are aimed at the characterisation of triple-junction cells. There are few contributions to the state of the art wherein the final object of the invention is the characterisation of complete systems or concentration optics. Furthermore, in those cases where this is the ultimate goal, there are a number of shortcomings that will induce significant differences compared to the results obtained to actual conditions of solar radiation. The main shortcoming identified is the inability to reproduce the solar spectrum within certain margins of error.

DETAILED DESCRIPTION OF THE INVENTION

The present invention describes a variable-spectrum solar simulator for characterisation of photovoltaic systems or components thereof. It solves problems present in the State of the Art described above, as it allows obtaining a spectrum adjusted to the solar spectrum, whether it is a standard spectrum or a real spectrum adjusted to local conditions of irradiation as well as allows the reproduction of spatial-angular characteristics of the sun. It basically comprises:

1) a broad spectrum light source or combination of several, the output radiant flux of which is carried out via an opening or a set of several specific, which henceforth are called primary source or Aperture Diaphragm (A.D.), for example one two slits (FIG. 1: A, B)
2) an optical system that collimates said primary source 3) a system that disperses the beam chromatically, for example, a diffraction grating
4) an optical system that forms an image of the primary source dispersed in a certain position, where there is placed
5) a fixed or dynamic spatial mask that allows spectrally filtering the received irradiance
6) an optical system that captures the filtered spectrum and redirects it, mix it, and focuses it on a secondary source with the spectral, spatial and angular characteristics sought
7) an optical system that collimates said secondary source such that it reproduces the angular characteristics of the sun or other specific angular characteristics.

The optical mechanisms and systems to perform said tasks can be of various types, but the key of the invention is the spatial distribution of the spectrum of a source to be able to spatially filter it at will by a mask and obtaining a radiation with a custom designed spectrum, particularly for the solar simulation application, but not limited to it.

Finally, with the object of facilitating the characterisation of photovoltaic systems and providing the simulator with greater versatility, an analogue or digital control system could be added, comprising:
1) a detection and measurement system of the spectrum emitted by the synthetic or simulated source.
2) an actuator over the active spatial mask that allows controlling the spectral filtering of the primary light according to the desired radiation spectrum

BRIEF DESCRIPTION OF THE FIGURES

To complement the description being made and in order to help a better understanding of it is accompanied by a set of drawings where, for purposes of illustration and not limitation, is represented, according to a preferred embodiment thereof, the following.

Basic scheme of operation of a spectral solar simulator in a possible embodiment where the light filtered is retro-reflected so that it recombines in the dispersing element to provide a secondary source which is subsequently collimated to represent the sun.

FIG. 2

Basic scheme of operation of a spectral solar simulator in a possible embodiment where the filtered light is introduced in an integrating sphere for mixing and this secondary source is subsequently collimated to simulate the sun

FIG. 3A

Aspect of the AM1.5D standard solar spectrum of direct solar irradiation

FIG. 3B

Spectrum that can be generated by the solar simulator based on the invention, for a spectral resolution of 10 nm, transferable to a given spatial resolution in the spatial mask.

FIG. 3C

Part C represents the A and B drawn in the same graph.

PREFERRED EMBODIMENT OF THE INVENTION

Figure 1:
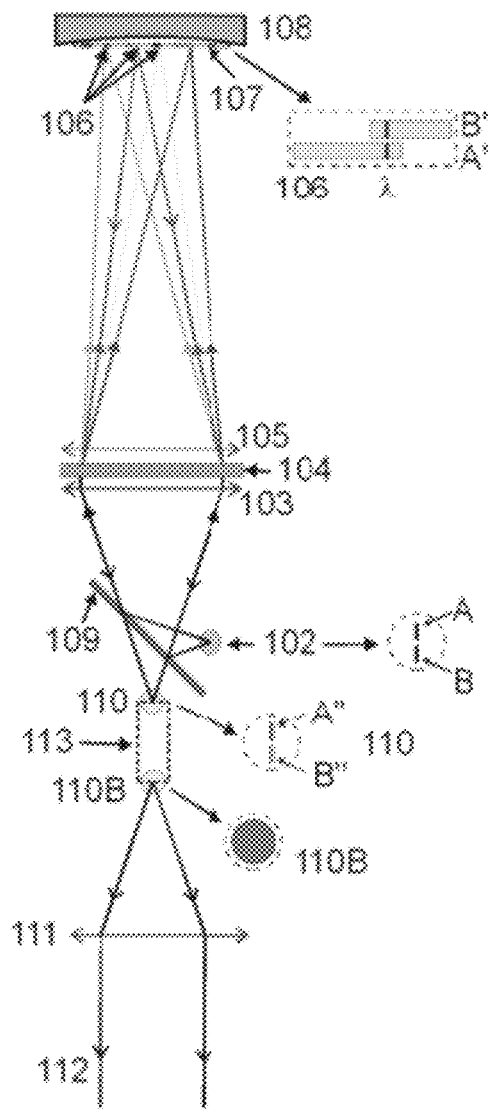
FIG. 1
Figure 2:
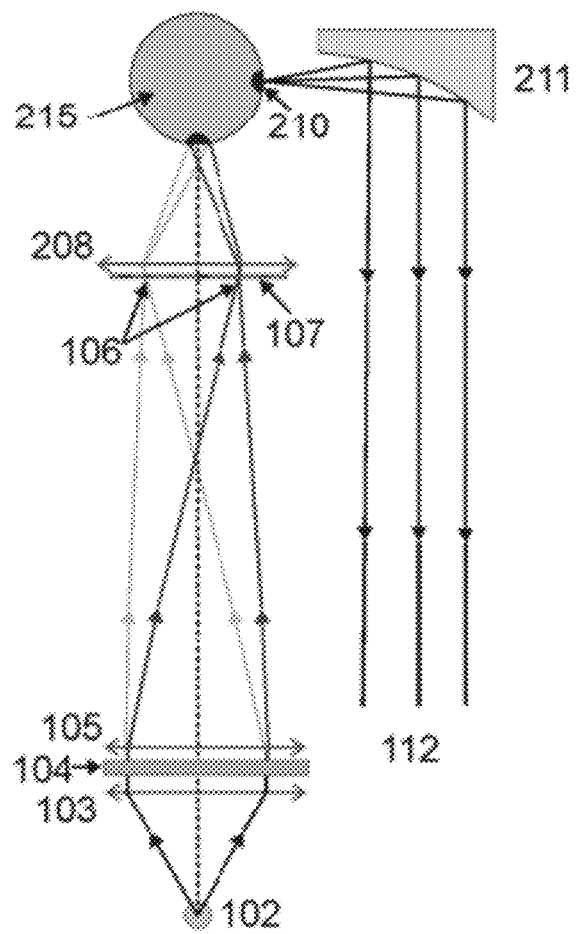

As shown in FIG. 1 and FIG. 2 in the system object of the invention, we must start from a broad spectrum radiation source or a combination of several sources adapted to illuminate a slit or slits (FIG. 1: A, B, . . . ) or other openings. The source openings set (102) make up the aperture diaphragm (A.D.) of the system or primary source and has the spectral characteristics of the original sources.

To filter it so that the spectrum obtained has the spectral distribution (e.g. solar) sought first a collimation of the A.D. (102) by means of lenses, mirrors or any equivalent optical system (103) that allow carrying out said function (known to everyone versed in the subject) is performed.

Then, this beam is passed through a dispersing element (chromatically) (104) that deflects the beam differently for each wavelength. The dispersing element (104) may be a diffraction grating (by reflection or transmission), a prism, a Zenger prism or an array or group of conventional or Zenger prisms.

An optical system (105) then projects an image (106) of the primary source (102) (or Exit Pupil (E.P.) of the system), but spectrally separated, i.e., to each wavelength corresponds a different position of the image or E.P. (FIG. 1: A', B', . . . ).

In the area where the image is formed and the spatial spectrum of the primary source is distributed, is placed a spatial mask (107) or an active device such as a DMA (Digital Mirror Array), LCD (Liquid Crystal Display), LCOS (LC On Silicon) or any other device that allows selective passage of light point by point, which allows that when acting with a spatial filtering it is translated into a custom-made spectral filtering.

Then a collecting optics as a mirror (108) or lens (208) is placed, the function of which is to capture the filtered light to introduce it into a spectrum re-mixing system.

This re-mixing system can be an integrating sphere (215), or the re-mix can operate applying the principle of reversibility by a mirror (108). That is, the light returning along the same path and forming an image of the A.D. or secondary source, for example in FIG. 1 in A", B" (110). This secondary source (110, 210) has the desired and mixed spectrum. An angular and spatial additional mixing is carried out through an integrating sphere (210) or a specific optical homogenizer (113). If at the inlet of the homogenizer (110) the light has a spatial distribution similar to that of the primary source (A", B"), when passing through the homogenizer, the light is distributed through a different opening, typically a circle (110B, 210), ensuring minimal loss of irradiance of the secondary source.

The homogenizer (113) may comprise a micro-lens array, a diffuser, a transparent cylinder or elongated mixing device, which alone or in combination allow redistributing and mixing the light into a solid angle of propagation similar to the one of the input. Thus, at the opening of the outlet of the homogenizer the light is spatially and angularly uniformly distributed.

Finally, a transmission (111) or reflection (211) optics captures the light mixed (110B, 210) and collimates it properly to maintain an specific or arbitrary collimation angular relationship, particularly one near solar collimation, and thus have a beam (112) according to specifications.

In the case of FIG. 1 a beam splitter (109) is added. If not present, all the light filtered and re-mixed would fall again on the primary opening (102). The beam splitter (109) allows working separately the light incident on the system and the one from the outlet. In the preferred embodiment, the beam splitter (109) is a simple mirror that would act at the light inlet, but not at the outlet, for example, slightly misaligning the system (108) in order to save the mirror (109) on the return. In essence, in the re-mixing mode by reversibility a certain misalignment on the return, allows preventing the image of the A.D. from falling on itself, regardless of whether there is a beam splitter or not, allowing operating with the secondary source (110) in the following.

The simulated source covers a greater angular distribution than solar, which allows saturating the angular acceptance or visual field of the photovoltaic concentrator systems and that the cell receives irradiance close to that of the real operation.

This whole system is accompanied by a system of analogue or digital control, comprising: a system for detection and measurement of the spectrum emitted by the synthetic or simulated source, an actuator on the active spatial mask that allows controlling the spectral filtering of the primary light according to the desired radiation spectrum. For this, the control system obtains the spectrum measured at the output of the device, compares it to the one desired and calculates how to act on the spatial mask or spectral filter to adjust to the level of radiation and spectrum sought.

Figure 3A:
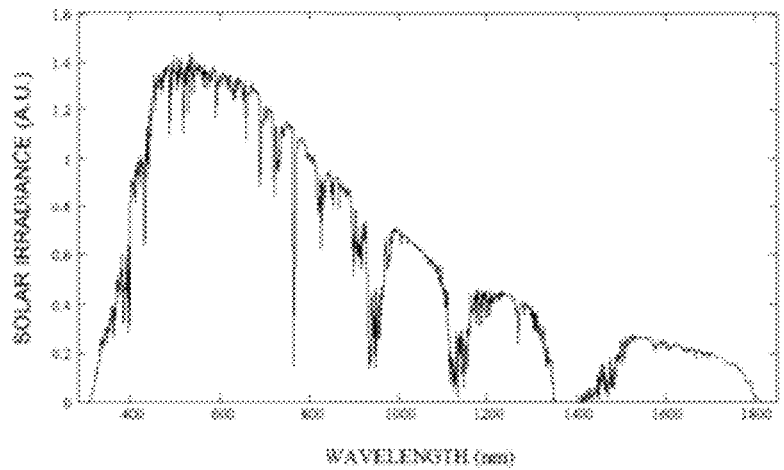
Figure 3B:
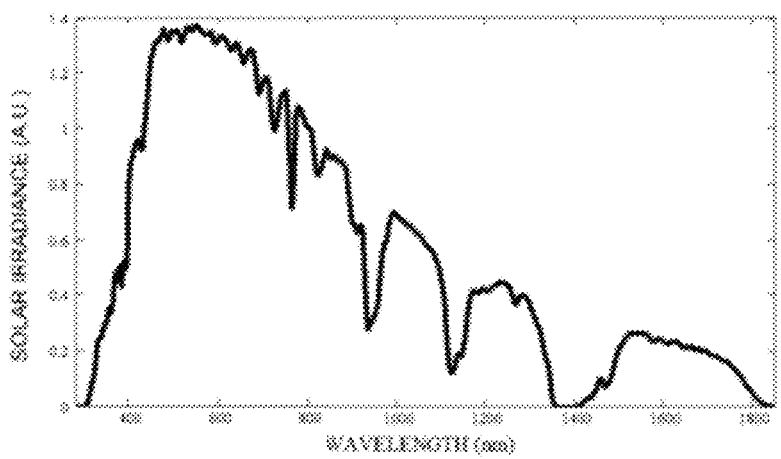
Figure 3C:
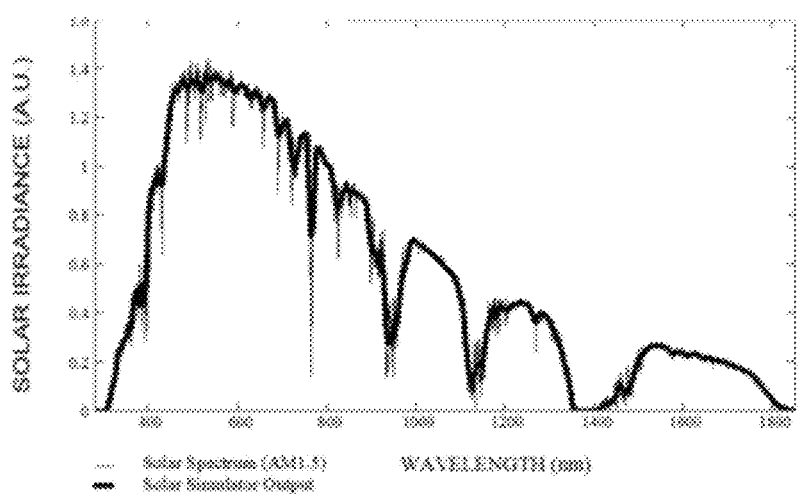

In FIG. 3A there is represented the AM1.5D standard solar spectrum of direct solar irradiation. FIG. 3B shows the spectrum generated by the solar simulator based on the invention, for a spectral resolution of 10 nm, transferable to a given spatial resolution in the spatial mask. FIG. 3C represents in the same graphic the A and B spectra, which shows the great similarity between the AM1.5 standard and the one generated by the solar simulator of the invention.

The invention claimed is:

1. A variable-spectrum solar simulator, comprising:
   A primary source including an aperture diaphragm providing a beam of broad spectrum radiation;
   A dispersing element which deflects the beam differently for each wavelength of light;
   An optical system that projects spectrally separated images of the primary source onto a device that allows selective passage of the light point by point, said device spatially filtering the beam of the light into a custom spectral filtering; and
   A re-mixing optical system placed behind the device, said re-mixing optical system reversing the light and forming a secondary source with a collimated beam having predefined spectrum and angular properties.

2. The variable-spectrum solar simulator according to claim 1 wherein the device is one of a spatial mask and an active device, and wherein said active device is one of a digital mirror array, a liquid crystal display and a LC On Silicon.

3. The variable-spectrum solar simulator according to claim 1, further comprising a specific optical homogenizer having an orifice, said homogenizer performing additional angular and spatial mixing so that the light from the secondary source is changed with minimal loss of irradiance from having a general spatial distribution to becoming a mixed light having a distribution according to a shape of the orifice.

4. The variable-spectrum solar simulator according to claim 3, wherein the homogenizer includes an element selected from a group comprising a micro-lens array, a diffuser, a transparent cylinder, and an elongated mixing device.

5. The variable-spectrum solar simulator according to claim 3, still further comprising a transmission optical system collecting the mixed light from the homogenizer and collimating the mixed light to become a new beam of predetermined specifications.

6. The variable-spectrum solar simulator according to claim 1, also comprising a beam splitter behind the re-mixing optical system, said beam splitter preventing the light from the secondary source from falling on the primary source.

7. The variable-spectrum solar simulator according to claim 6, wherein the beam splitter is a simple mirror.

8. The variable-spectrum solar simulator according to claim 3, wherein the orifice of the homogenizer has the shape of a circle.

9. The variable-spectrum solar simulator according to claim 1, wherein the re-mixing optical system includes a mirror.

10. A variable-spectrum solar simulator, comprising:
    A primary source including an aperture diaphragm providing collimated beam of broad spectrum radiation;
    A dispersing element which deflects the beam differently for each wavelength of light;
    A projecting optical system that projects spectrally separated images of the primary source onto a device that allows selective passage of the light point by point, said device spatially filtering the beam of the light into a custom spectral filtering to form filtered light; and
    A collecting and remixing optical system placed behind the device and including an integrating sphere, said collecting and remixing optical system collecting the filtered light and introducing the filtered light to the integrating sphere, said integrating sphere having an output forming a secondary source of output light which has a predetermined angular distribution, a predetermined spatial distribution and a predetermined spectrum.

11. The variable-spectrum solar simulator according to claim 10, further comprising a reflection optical system installed behind the integrating sphere, said reflection optical system collecting the output light from the secondary source and collimating the output light into an output beam according to predetermined specifications.

12. The variable-spectrum solar simulator according to claim 10, wherein the secondary source is a solar light source.

13. The variable-spectrum solar simulator according to claim 10, wherein the device is one of a spatial mask and an active device, and wherein said active device is one of a digital mirror array, a liquid crystal display and a LC On Silicon.

* * * * *